July 10, 1956   D. W. KELBEL   2,753,728
TRANSMISSION
Filed Oct. 1, 1951   3 Sheets-Sheet 1

Inventor:
Donald W. Kelbel
By: Frank C. Parker
Atty.

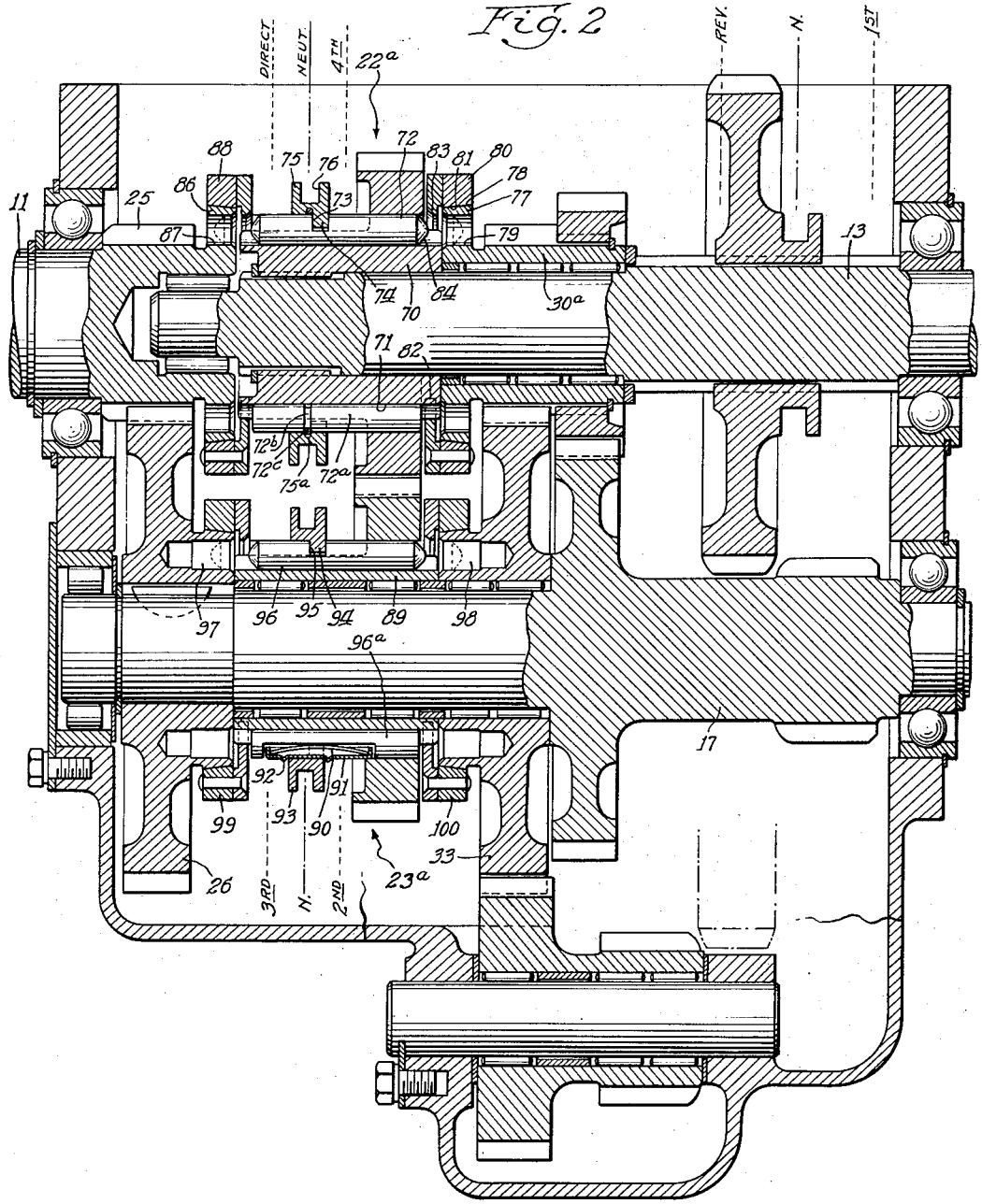

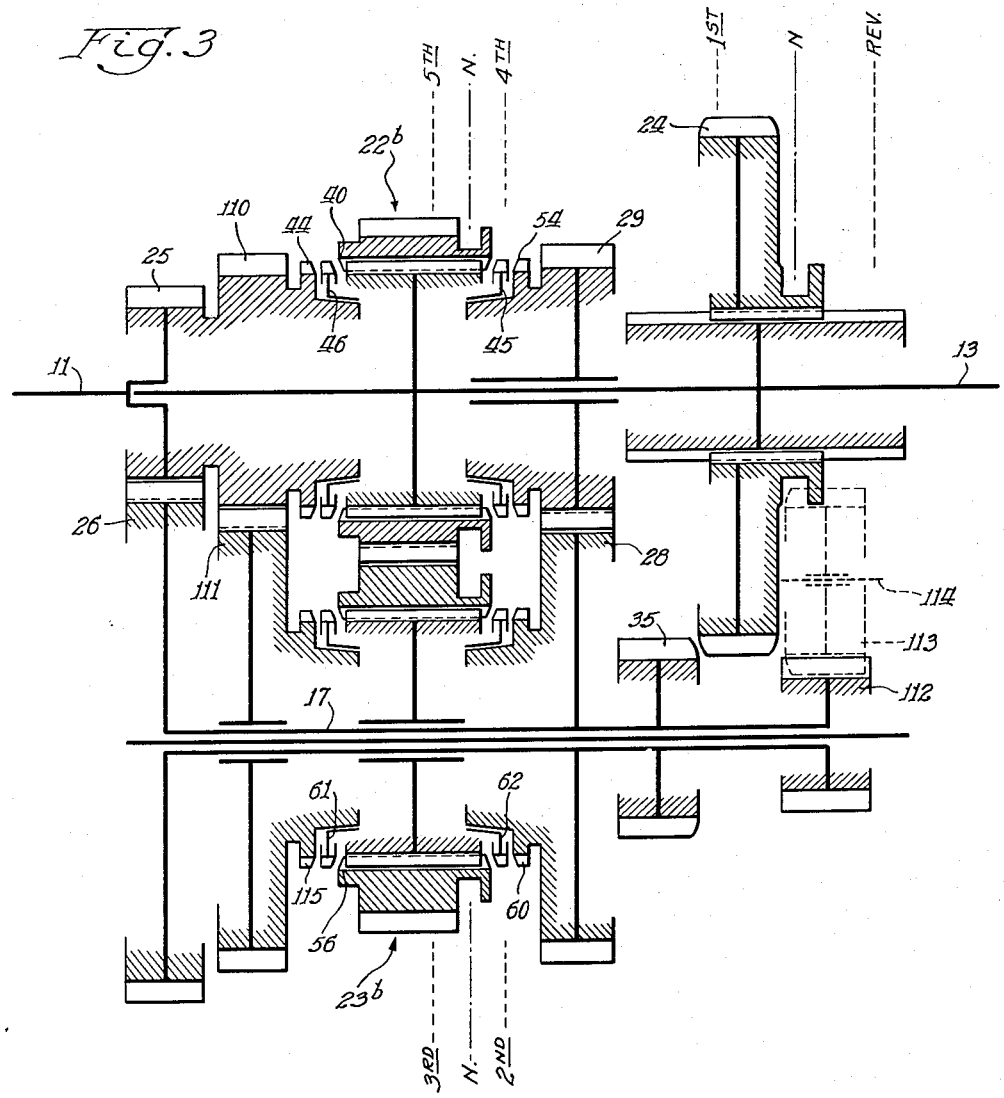

United States Patent Office 2,753,728
Patented July 10, 1956

2,753,728

TRANSMISSION

Donald W. Kelbel, Muncie, Ind., assignor to The Borg-Warner Corporation, Chicago, Ill., a corporation of Illinois Application October 1, 1951, Serial No. 249,067

20 Claims. (Cl. 74—359)

The present invention relates to transmissions in general and more particularly to transmissions of the heavy-duty type suitable for use in trucks.

The principal object of the present invention is to provide a truck transmission of the countershaft type which will provide five different forward driving ratios and a single reverse driving ratio and which, as a whole, is short and compact.

In accomplishing the foregoing principal object of the present invention, two embodiments thereof utilize a pair of shiftable and meshing combined gear and clutch members each of which is shiftable into clutching engagement with either one of a pair of associated torque transmitting gear members. By utilizing the shiftable gear and clutch members themselves for transmitting torque it is possible to greatly reduce the space required for housing the transmission.

Accordingly, a more specific object of the invention is to provide a transmission utilizing meshing torque transmitting members, each of which is shiftable into positive clutching engagement with either one of a pair of associated torque transmitting gear members after synchronizing means between the shiftable member and the associated members has synchronized the speeds of rotation thereof.

A further specific object of the invention is to provide a countershaft type transmission wherein a driven shaft and a countershaft are each provided with a sleeve shaft rotatable therearound and wherein at least one of the power trains through the transmission proceeds through both sleeve shafts and the countershaft.

It is another object of the invention as disclosed in another embodiment thereof to provide a transmission wherein the meshing combined gear and clutch members are axially fixed and clutch connected with their associated torque transmitting gear members by pin type synchronizing clutches of the general type disclosed in the patent to Kelbel, 2,563,726. Otherwise this embodiment of the invention is not materially different from one of the embodiments utilizing the shiftable combined gear and clutch members.

The above and other objects and advantages of the present invention will become apparent from the following detailed description when read in conjunction with the accompanying drawings, wherein:

Fig. 2 is a side elevational view of a modified form of the invention; and

Fig. 3 is a schematic side elevational view of a second modification of the invention.

Figure 1:
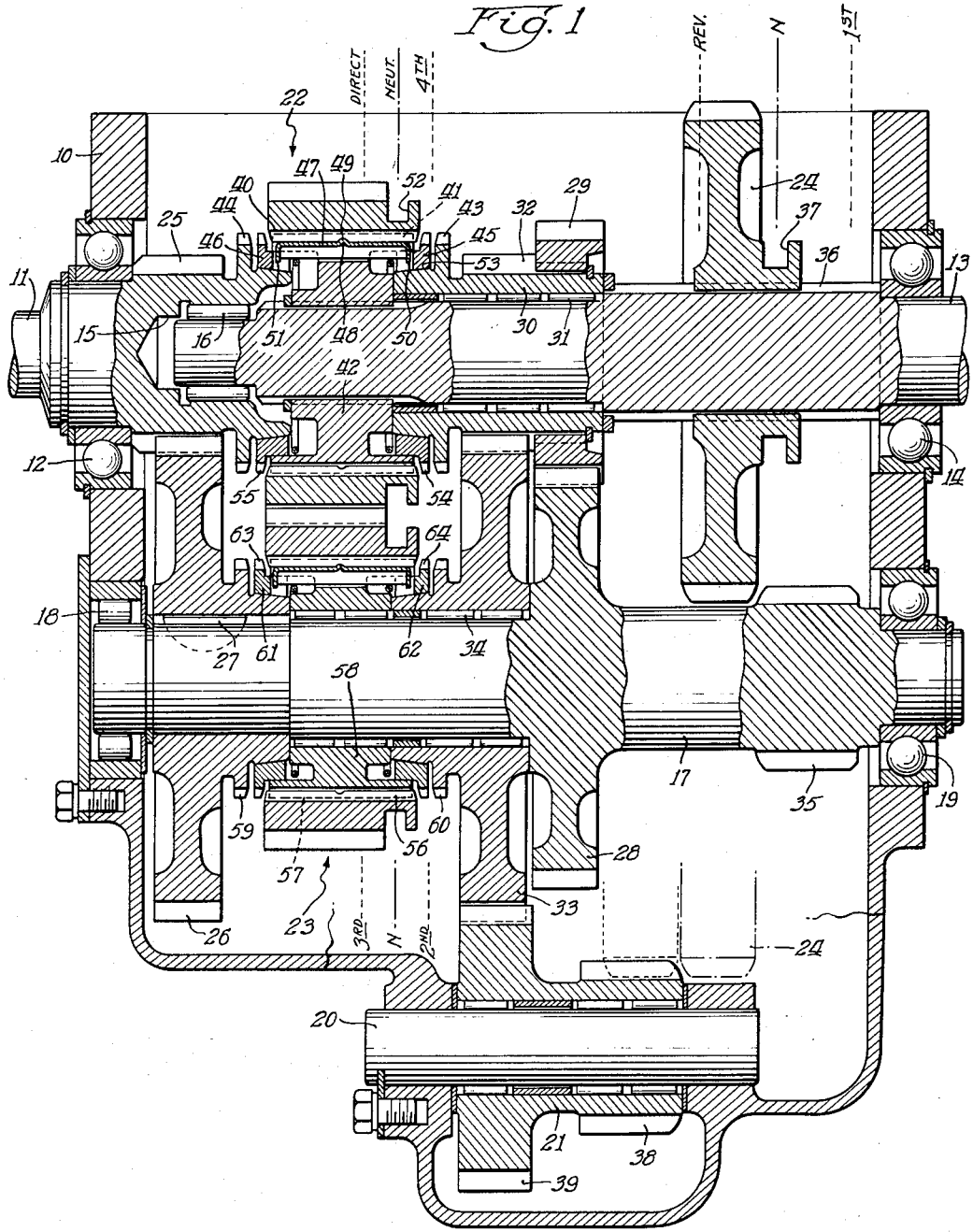
Fig. 1 is a side elevational view of one form of the invention.

With reference now to the drawings, and with particular reference to Fig. 1 thereof, the transmission disclosed in this figure is housed in a suitable casing 10 and includes a drive shaft 11 rotatably mounted in the casing 10 by means of ball bearing elements 12 and adapted to be driven by the engine (not shown) of the vehicle with which the transmission is associated. The transmission also includes a driven shaft 13 rotatably mounted in the casing 10 by means of ball bearing elements 14 and piloted and journaled by means of needle bearings 16 within an axially extending opening 15 formed in the drive shaft 11. The transmission also includes a countershaft 17 rotatably mounted in the casing 10 by means of roller bearing elements 18 and ball bearing elements 19. A second countershaft 20 is provided for rotatably mounting a spool 21 in order to provide reverse drive between the drive shaft 11 and the driven shaft 13.

A pair of shiftable combined gear and clutch members, indicated generally by reference numerals 22 and 23, are respectively carried by the driven shaft 13 and the countershaft 17 for providing the four highest forward driving ratios through the transmission and a shiftable gear member 24 is provided for effecting the lowest forward speed ratio and the reverse driving ratio through the transmission.

The drive shaft 11 is provided with an integral gear 25 in continuous mesh with a gear 26 keyed to the countershaft 17 by means of a key 27. The countershaft 17 is provided with an integral gear 28 which continuously meshes with a gear 29 splined and keyed to a short sleeve shaft 30 rotatably mounted on the driven shaft 13 by means of needle bearings 31. The sleeve shaft 30 is provided with an integral gear 32 that continuously meshes with a gear 33 rotatably mounted on the countershaft 17 by means of needle bearings 34. The countershaft 17 is also provided with an integral gear 35 designed to be engaged by the gear member 24 slidably splined to the driven shaft 13 by means of spline teeth 36.

The gear member 24 is provided with a peripheral groove 37 adapted to be engaged by a shift fork (not shown) in order to shift the gear member 24 axially on the driven shaft 13 into engagement with either the gear 35, in order to complete the lowest forward speed drive through the transmission or to the left in order to engage a gear 38 to complete the reverse drive between the drive shaft 11 and the driven shaft 13. The gear 38 is integrally formed on the spool 21 which also is formed with a gear 39 that continuously meshes with the gear 33.

As stated heretofore, the combined gear and clutch members 22 and 23 are continuously in mesh with each other. The gear and clutch member 22 is formed with internal spline teeth 40 which engage corresponding external spline teeth 41 formed on a hub 42 splined and keyed to the driven shaft 13. The gear and clutch member 22 is shiftable to either the right or left to bring its internal spline teeth 40 into clutching engagement with corresponding external clutch teeth 43 and 44 respectively formed on the sleeve shaft 30 and on the gear 25. Mounted between the gear and clutch member 22 and the clutch teeth 43 and 44 are a pair of conventional synchronizer rings 45 and 46 each of which has a lost motion connection with the hub 42. A plurality of yieldable thrust members 47 are mounted between the gear and clutch member 22 and the hub 42 and each of these thrust members is bent medially to provide a projection 48 adapted to seat in a corresponding recess 49 formed on the internal periphery of the gear and clutch member 22. The thrust members 47 are also provided respectively on each end with radially inwardly extending projections 50 and 51. A peripheral groove 52, formed in the gear and clutch member 22, is designed to be engaged by a shift fork (not shown) in order to shift the member 22 either to the right or to the left to bring its internal teeth 40 into clutching engagement with the teeth 43 or 44.

Upon movement of the shift fork, seated within the peripheral groove 52, so as to cause movement of the gear and clutch member 22 to the right, the projection 48, being seated in the recess 49, causes the thrust members 47 also to be moved to the right, thereby effecting engagement between the projections 50 and the synchronizer ring 45. Continued movement of the gear member 22 to the right causes the synchronizer ring to frictionally engage a conical surface 53 formed on the sleeve shaft 30 so as to frictionally connect the gear member 22 with the sleeve shaft 30. As long as there is a difference in the speeds of rotation of the gear and clutch member 22 and the sleeve 30 the frictional drag exerted upon the synchronizer 45 causes the synchronizer to move to the limit of its lost motion connection with the hub 42 and to be retained in a position wherein its external teeth 54 block the internal teeth 40 on the gear and clutch member 22 against further axial advance. Upon the continued application of force, tending to move the gear and clutch member 22 to the right, the speeds of rotation of the member 22 and the sleeve shaft 30 become synchronized and thereupon the teeth 54 rotate through a small increment to a position wherein they no longer block axial advance of the internal teeth 40. The gear and clutch member 22 may then be moved further to the right to bring its internal teeth 40 into clutching engagement with the teeth 43 and thereby clutch this member to the sleeve shaft 30.

The synchronizer ring 46 is provided with external blocker teeth 55 and upon movement of the gear and clutch member 22 to the left, the blocker teeth 55 initially prevent axial advance of the gear and clutch member 22 until the speeds of rotation of the member 22 and shaft 11 are synchronized.

The gear and clutch member 23 is substantially identical with the gear and clutch member 22 and is formed with the internal spline clutch teeth 56 which slidably engage external spline teeth 57 formed on a hub 58 rotatable about the countershaft 17 by means of needle bearings 34. The gear and clutch member 23 is movable to the left and right respectively to bring its internal teeth 56 into positive clutching engagement with either a set of external clutch teeth 59 formed on the gear 26 or with a set of external clutch teeth 60 formed on the gear 33. Respectively positioned between the internal teeth 56 and the two sets of external teeth 59 and 60 are a pair of synchronizer rings 61 and 62 which have a lost motion connection with the hub 58. These two synchronizer rings are each formed with external blocker teeth respectively identified by reference numerals 63 and 64 and function in the same manner as the synchronizer rings 46 and 45 to effect synchronization between the gear and clutch member 23 and the gears 26 and 33 prior to permitting positive clutching engagement between these members.

The transmission disclosed in Fig. 1 provides five different forward driving ratios and a single reverse driving ratio. The first or lowest forward driving ratio is established upon movement of the gear member 24 to the right to bring its teeth into meshing engagement with the external teeth on the gear 35. Both gear and clutch members 22 and 23 occupy their neutral positions and a power train is established at this time which proceeds from the drive shaft 11 through the gears 25 and 26, through the countershaft 17 and gear 35 and thence through the gear member 24 to the driven shaft 13. It will be noted that this power train affords substantial reduction due to the relative sizes of the different gears through which it proceeds.

The second forward speed power train through the transmission is established by moving the gear and clutch member 23 to the right to bring its internal teeth 56 into positive clutching engagement with the external clutch teeth 60 on the gear 33, the members 22 and 24 occupying their neutral positions at this time. The synchronizer ring 62 between the gear and clutch member 23 and the clutch teeth 60 permits the establishment of a second forward speed power train while the different shafts are rotating. The second forward speed power train proceeds from the drive shaft 11 through the gears 25 and 26 to the countershaft 17 and from the countershaft 17 it proceeds through the gears 28, 29, 32 and 33 to the gear and clutch member 23. The member 23, being in continuous mesh with the member 22, transmits the drive to the driven shaft 13. It will be noted that the second speed drive proceeds through the countershaft 17, the sleeve shaft 30 and the sleeve shaft comprising the hub of the gear 33.

The third forward speed drive through the Fig. 1 embodiment of the invention is established upon movement of the gear and clutch member 23 to the left into positive clutching engagement with the gear 26 and this power train proceeds from the drive shaft 11 through the gears 25 and 26 and through the two gear and clutch members 23 and 22 to the driven shaft 13.

The fourth forward speed power train is established by moving the gear and clutch member 22 to the right to bring its internal clutch teeth 40 into positive clutching engagement with the teeth 43 while the two members 23 and 24 occupy their neutral positions. The fourth power train proceeds from the drive shaft 11 through the gears 25 and 26, through the countershaft 17, through the gears 28 and 29, through the sleeve shaft 30 and thence through the gear and clutch member 22, positively clutched to the sleeve shaft 30 to the driven shaft 13.

The fifth forward speed power train through the transmission comprises a direct drive and is established by moving the gear and clutch member 22 to the left to bring its internal clutch teeth into positive engagement with external clutch teeth 44 integrally formed on the drive shaft 11. As is obvious, this effects a positive connection between the drive shaft 11 and the driven shaft 13 so that they both rotate in unison.

The reverse drive through the transmission is established by moving the gear member 24 to the left to bring its external torque transmitting gear teeth into mesh with the external teeth on the gear 38 of the spool 21. It is assumed, of course, that the two gear and clutch members 22 and 23 will be positioned in their neutral positions at this time. The reverse power train then proceeds from the drive shaft 11 through the gears 25 and 26 to the countershaft 17, through the gears 28, 29, 32 and 33 to the spool 21, and from the spool 21 to the driven shaft 13 through the gears 38 and 24. The spool 21 functions to reverse the drive so as to cause the driven shaft 13 to be driven in the opposite direction from the direction of rotation of the drive shaft 11.

A modified form of the invention is disclosed in Fig. 2 and differs from the embodiment of Fig. 1 only in that a different type of friction and positive clutch means are utilized for establishing the positive connections necessary to complete the four highest forward speed drives through the transmission. In view of the similarity between the other parts in the Fig. 1 and Fig. 2 embodiments of the invention, these other parts will not be described again in detail.

In the Fig. 2 embodiment of the invention a pair of continuously meshing torque transmitting gear and clutch members 22a and 23a correspond respectively with the gear and clutch members 22 and 23 in Fig. 1, however the gear and clutch members 22a and 23a are longitudinally fixed respectively on the driven shaft 13 and countershaft 17. Due to the fact that the members 22 and 23 in Fig. 1 are each longitudinally shiftable to establish the different driving ratios they must be of the spur type, however, the members 22a and 23a may be formed with helical teeth which produces much quieter operation. The member 22a rotates in unison with a hub 70 keyed to the driven shaft 13 and has a plurality of axially extending apertures 71 within which a corresponding number of alternately arranged axially movable torque transmitting pins 72 and thrust transmitting pins 72a are positioned. Each of the pins 72 has its ends chamfered and is provided with a notch 73 for receiving a radially inwardly extending flange 74 formed on a shift collar 75.

The shift collar 75 is provided with a peripheral groove 76 which receives a shift fork (not shown) for shifting the collar to the left and right respectively.

The thrust transmitting pins 72a are formed with flat end faces and each is provided with a peripheral groove 72b for receiving a snap ring 72c. The snap ring 72c circumvents all of the pins 72 and 72a and normally tends to seat in an internal peripheral groove 75a to releasably connect the collar 75 and the pins 72a.

Sleeve shaft 30a, which corresponds to the sleeve shaft 30 in Fig. 1, is provided with a peripheral collar 77 having a conical peripheral surface 78 and a plurality of axially extending pin receiving apertures 79. The apertures 79 correspond in number to the apertures 71 in the hub 70 of the gear and clutch member 22a and are aligned so that the pins 72 may enter the apertures 79.

A synchronizer ring 80, having an internal conical friction engaging surface 81 complementary to the external conical surface 78, is provided for synchronizing the speeds of rotation of the gear and clutch member 22a and the sleeve shaft 30a prior to the entrance of the pins 72 into the apertures 79 to effect positive clutching engagement between the member 22a and the sleeve shaft 30a. The hub 70 is provided with a plurality of peripherally extending slots (not shown) within which a corresponding number of radially inwardly extending projections 82 integrally formed on the synchronizer ring 80 are positioned. The slots provide a lost motion connection between the hub 70 and the synchronizer ring projections 82 so as to permit slight relative angular or rotative movement between the synchronizer ring 80 and the gear and clutch member 22a. The synchronizer ring 80 is also provided with substantially circumferential openings defined by chamfered blocking portions 83 for preventing the axial advance of the pins 72 to the right prior to alignment between the apertures 71 and 79 and synchronization between the gear and clutch member 22a and the sleeve shaft 30a.

Upon movement of the shift collar 75 to the right, the pins 72 and 72a are also moved to the right until the pins 72a strike the synchronizer ring 80, whereupon the synchronizer ring 80 is moved slightly to the right to bring its internal conical friction surface 81 into engagement with external conical friction surface 78 on the collar 77. If there is a difference between the speeds of rotation of the gear and clutch member 22a and the sleeve shaft 30a there is a frictional drag between the two friction surfaces 78 and 81 that causes the blocking portions 83 to be maintained in a position preventing further axial advance of the pins 72. When the condition of synchronization is reached between the gear and clutch member 22a and sleeve shaft 30a, the apertures 71 and 79 become aligned so that the shift collar 75 may be moved further to the right. Further shifting movement of the collar 75 to the right causes the snap ring 72c to be compressed, thereby providing a detent action permitting the collar 75 to move axially relative to the pins 72a and to thereby advance the pins 72 into the apertures 79. The gear and clutch member 22a is then positively clutched to the sleeve shaft 30a.

It will be recalled that the ends of the pins 72 are chamfered, as at 84, and that the blocking portions 83 are chamfered and it will be noted that the left ends of the apertures 79 comprise peripheral chamfered portions, all of which facilitate the axial advance of the pins into the apertures 79.

The gear 25 is formed with a peripheral collar 86, substantially identical with the collar 77, and having apertures 87 for receiving the pins 72 when they are moved to the left in order to clutch the drive shaft 11 directly to the driven shaft 13. A synchronizer ring 88 substantially identical with the synchronizer ring 80 is also provided for effecting synchronization between the speeds of the drive shaft 11 and the driven shaft 13 prior to positive clutching engagement between these shafts by the entrance of the pins 72 into the apertures 87. The pins 72a, in conjunction with the synchronizer ring 88 function to initially synchronize the speeds of the drive shaft 11 and the driven shaft 13 and thereafter the pins 72 function to positively connect these shafts together in the same manner as the synchronizer 80 functions to synchronize and positively connect the sleeve shaft 30 with the gear and clutch member 22a. Accordingly, further description of the synchronizer ring 88 and the manner in which it operates upon movement of the collar 75 to the left is not deemed necessary.

The gear and clutch member 23a concentrically mounted around the countershaft 17, is designed to be clutched to the gears 26 and 33 in substantially the same manner as the gear member 22a may be clutched either to the drive shaft 11 or to the sleeve shaft 30a. The gear and clutch member 23a is secured to rotate in unison with a hub 89 rotatably mounted on the countershaft 17. The hub 89 and gear and clutch member 23a are provided with axially extending apertures, for receiving pins 96 and 96a corresponding respectively with the pins 72 and 72a. The pins 96a are notched so as to receive a detent mechanism comprising a plurality of leaf springs 90 and associated detent bars 91. The detent bars 91 are crimped peripherally, as at 92, to provide a releasable connection between a shift collar 93 and the pins 96a and hub 89. The shift collar 93 is provided with flanges 94 seated within notches 95 formed in each of the pins 96. The pins 96 are shiftable axially into corresponding recesses 97 and 98 respectively formed in the gear members 26 and 33 and synchronizer rings 99 and 100 are provided for synchronizing the speeds of rotation of the elements to be positively connected.

When the shift collar 93 is shifted axially the pins 96a initially transmit the thrust to the synchronizer rings and when synchronization is reached, further shifting force applied to the collar 93 causes the detent bars 91 to retract and permit the collar 93 to be shifted further to thereby move the pins 96 into the recesses 97 or 98 and thus positively clutch the gear 26 or 33 respectively, to the gear and clutch member 23a.

The crimps 92 in the detent bars 91 acting in conjunction with the pins 96a, when the collar 93 is shifted, function to transmit an initial energizing thrust against the synchronizer rings, the shift fork (not shown) functioning to hold the collar 93 in its neutral position when no shifting force is being applied.

Due to the fact that the different power trains establishable through the transmission disclosed in Fig. 2 are substantially identical with those establishable in Fig. 1 and because the power trains are established in substantially the same manner in both transmissions, no detailed description of the operation of the Fig. 2 transmission corresponding to each position of the different shiftable members will be given.

With reference to the embodiment of the invention disclosed in Fig. 3 is should first be noted that this embodiment is quite similar to both of the others, differing therefrom in the arrangement for providing a reverse drive and in the gearing utilized for providing the second and third forward speed driving ratios. Otherwise, the modification disclosed in Fig. 3 is substantially the same as the transmission disclosed in Fig. 1.

In the Fig. 3 embodiment, the drive shaft 11 is provided with the gear 25 and also with a gear 110. The gear 25 meshes with the gear 26 on the countershaft 17 and the gear 110 meshes with a gear 111 rotatably mounted on the countershaft 17. The countershaft 17 is provided with the gear 35 and, in addition, also is provided with a gear 112 which meshes continuously with an idler gear 113 rotatable about a second countershaft 114 and effective to provide a reverse drive through the transmission. The shiftable gear member 24 is movable to the left to bring its teeth into mesh with the gear 35 in order to provide the lowest forward speed drive through the transmission and movable to the right to bring its teeth into mesh with the idler gear 113 in order to provide the reverse drive through the transmission.

The gear 28 integrally formed on the countershaft 17 continuously meshes with the gear 29 rotatably mounted on the driven shaft 13. Shiftable gear and clutch members 22b and 23b, respectively splined to the driven shaft 13 and rotatably mounted on the countershaft 17, correspond to the gear members 22 and 23 in Fig. 1 and are in continuous mesh with each other.

The shiftable gear and clutch member 22b has associated synchronizer rings 46 and 45 and is movable to the left and right respectively to bring its internal clutch teeth 40 into clutching engagement with the corresponding external clutch teeth 44 or 54. The shiftable gear member 23b has associated synchronizer rings 61 and 62 and is shiftable to the left and right respectively to bring its internal clutch teeth 56 into clutching engagement with corresponding external clutch teeth 115 formed on the gear 111 and external clutch teeth 60 on the gear 28. The gear and clutch members 22b and 23b and their associated synchronizing devices are substantially identical with the corresponding members in the Fig. 1 embodiment and further detailed description of the manner of operation thereof is not deemed necessary.

A description of the operation of the Fig. 3 embodiment of the invention will now be given. The lowest or first forward speed power train is established by moving the gear member 24 to the left into mesh with the gear 35 and the power train thus established proceeds from the drive shaft 11 through the gears 25 and 26, through the countershaft 17, and through the gears 35 and 24, to the driven shaft 13. The second forward speed drive is established by moving the gear member 23b to the right into positive clutching engagement with the gear 28 and this power train proceeds from the drive shaft 11, through the gears 25 and 26, through the countershaft 17, through the gear 28 positively clutched to the gear and clutch member 23b and thence through the gear and clutch members 23b and 22b to the driven shaft 13. The third forward speed drive is established by moving the gear and clutch member 23b to the left to positively clutch this member to the gear 111 and this drive proceeds from the drive shaft 11, through the gears 110 and 111, through the gear and clutch members 23b and 22b to the driven shaft 13. The fourth forward speed drive is established by moving the gear and clutch member 22b to the right to positively clutch it to the gear 29 and the drive thereby established proceeds from the drive shaft 11, through the gears 25 and 26, through the countershaft 17, through the gears 28 and 29 and through the gear and clutch member 22b to the driven shaft 13. The direct forward speed drive through the transmission is established by moving the gear and clutch member 22b to the left, whereupon the drive shaft 11 and driven shaft 13 are positively connected together and rotate in unison. Reverse drive is established when the gear member 24 is moved to the right into mesh with the idler gear 113 and the drive established proceeds from the drive shaft 11 through the gears 25 and 26, through the countershaft 17 and through the gears 112, 113, and 24 to the driven shaft 13, the idler gear functioning to reverse this drive.

As will be apparent to those skilled in the art, the present invention provides a countershaft type transmission which is suitable for heavy-duty operation and due to the particular arrangement of parts occupies a minimum of space. Three different embodiments of the present invention have been disclosed particularly for purposes of illustration and it is contemplated that numerous changes and other modifications may be made in the invention without departing from the spirit or scope thereof.

What is claimed is:

1. In a transmission, the combination of a drive shaft, a driven shaft disposed in axial alignment with said drive shaft, a countershaft, gearing carried by each of said shafts for providing a plurality of power trains between said drive and driven shafts and comprising a plurality of elements including a first gear member rotatable with said driven shaft and a second gear member rotatable with respect to said countershaft, said gear members being in continuous mesh with each other, and selectively operable clutch means for clutch connecting each of said gear members to either one of a pair of said elements to selectively complete the different power trains.

2. In a transmission, the combination of a drive shaft, a driven shaft disposed in axial alignment with said drive shaft, a countershaft, gearing carried by each of said shafts for providing a plurality of power trains between said drive and driven shafts and comprising a plurality of elements including a first gear member rotatable with said driven shaft and a second gear member rotatable with respect to said countershaft, said gear members being in continuous mesh with each other, and selectively operable friction and positive clutch means for selectively synchronizing the speed of either of said gear members with the speed of either one of a pair of said other elements associated therewith and thereafter positively connecting the synchronized gear member and other element to selectively complete the different power trains.

3. In a transmission, the combination of a drive shaft, a driven shaft disposed in axial alignment with said drive shaft, a countershaft, gearing carried by each of said shafts for providing a plurality of power trains between said drive and driven shafts and comprising a plurality of elements including a first gear member rotatable with said driven shaft and a second gear member rotatable with respect to said countershaft, said gear members being in continuous mesh with each other and each of said gear members including a positive clutch element, two pairs of said elements being respectively associated with each of said gear members and each of said last-mentioned elements including positive clutch means, and means for selectively connecting the positive clutch element of each of said gear members selectively with the positive clutch means on its associated pair of elements of said gearing to selectively complete the different power trains.

4. In a transmission, the combination of a drive shaft, a driven shaft disposed in axial alignment with said drive shaft, a countershaft, means for providing a pair of power trains between said drive and driven shafts, said means including meshing first and second torque transmitting members respectively associated with said driven shaft and said countershaft, said first torque transmitting member being rotatable with said driven shaft and said second torque transmitting member being rotatable with respect to said countershaft, said means also including third and fourth torque transmitting members carried by said countershaft, and clutch means for selectively connecting said second torque transmitting member with either said third or fourth torque transmitting member to selectively complete said pair of power trains between said drive and driven shafts.

5. In a transmission, the combination of a drive shaft, a driven shaft disposed in axial alignment with said drive shaft, a countershaft, means for providing a pair of power trains between said drive and driven shafts, said means including meshing first and second torque transmitting members respectively associated with said driven shaft and said countershaft, said first torque transmitting member being rotatable with said driven shaft and said second torque transmitting member being rotatable with respect to said countershaft, said means also including third and fourth torque transmitting members carried by said countershaft, positive clutch teeth on each of said second, third and fourth torque transmitting members, and means for shifting said second torque transmitting member to selectively bring its clutch teeth into clutching engagement with the positive clutch teeth on said third and fourth torque transmitting members to thereby selectively complete said pair of power trains between said drive and driven shafts.

6. In a transmission, the combination of a drive shaft, a driven shaft disposed in axial alignment with said drive shaft, a countershaft, means for providing a pair of power trains between said drive and driven shafts, said means including meshing first and second torque transmitting members respectively associated with said driven shaft and said countershaft, said first torque transmitting member being rotatable with said driven shaft and said second torque transmitting member being rotatable with respect to said countershaft, said means also including third and fourth torque transmitting members respectively carried by said driven shaft and said drive shaft, positive clutch teeth on each of said first, third and fourth torque transmitting members, and means for shifting said first torque transmitting member to selectively bring its clutch teeth into clutching engagement with the positive clutch teeth on either said third or said fourth torque transmitting member to thereby selectively complete said pair of power trains between said drive and driven shafts.

7. In a transmission, the combination of a drive shaft, a driven shaft disposed in axial alignment with said drive shaft, a countershaft, means for providing a pair of power trains between said drive and driven shafts, said means including meshing first and second torque transmitting members respectively associated with said driven shaft and said countershaft, said first torque transmitting member being rotatable with said driven shaft and said second torque transmitting member being rotatable with respect to said countershaft, said means also including third and fourth torque transmitting members carried by said countershaft and fifth and sixth torque transmitting members respectively carried by said driven shaft and said drive shaft, positive clutch teeth on all of said torque transmitting members, means for shifting said first torque transmitting member to bring its teeth into positive clutching engagement with the teeth on either of said fifth and sixth torque transmitting members, and means for shifting said second torque transmitting member to bring its teeth into positive clutching engagement with the teeth on either said third or fourth torque transmitting member to thereby selectively complete the power trains between said drive and driven shafts.

8. In a transmission, the combination of a drive shaft, a driven shaft disposed in axial alignment with said drive shaft, a countershaft, means for providing a pair of power trains between said drive and driven shafts, said means including meshing first and second torque transmitting members respectively associated with said driven shaft and said countershaft, said first torque transmitting member being rotatable with said driven shaft and said second torque transmitting member being rotatable with respect to said countershaft, said means also including third and fourth torque transmitting members carried by said countershaft, said third and fourth torque transmitting members each defining pin receiving apertures, friction clutch means associated with each of said third and fourth torque transmitting members, and a plurality of shiftable pins carried by said second torque transmitting member selectively movable into the apertures in said third and fourth torque transmitting members to positively connect the second torque transmitting member with either the third or fourth torque transmitting member to thereby selectively complete said pair of power trains, said friction clutch means functioning upon the shifting of said pins to synchronize the speeds of rotation of the torque transmitting members to be positively connected and thereafter to permit the pins to enter the apertures.

9. In a transmission, the combination of a drive shaft, a driven shaft, a countershaft, means drivingly connecting said drive shaft and said countershaft, gear means rotatably mounted on said driven shaft, a plurality of gears carried by said countershaft, one of said gears being rotatable with said countershaft and drivingly connected with said gear means, another of said gears being rotatable with respect to said countershaft and drivingly connected with said gear means, and positive clutch means selectively operable for drivingly connecting said other of said gears with said driven shaft to thereby complete a power train from said drive shaft to said driven shaft and extending through said gear means and through said plurality of gears.

10. In a transmission, the combination of a drive shaft, a driven shaft disposed in axial alignment with said drive shaft, a countershaft, means drivingly connecting said drive shaft and said countershaft, a plurality of gears carried by said countershaft, gear means rotatably mounted on said driven shaft and drivingly connected with said plurality of gears, and a combined gear and clutching member drivingly connected with said driven shaft and selectively slidable into clutching engagement with one of said gears to thereby complete a power train from said drive shaft to said driven shaft which extends through said gear means and said plurality of gears.

11. In a transmission, the combination of a drive shaft, a driven shaft disposed in axial alignment with said drive shaft, a countershaft, means drivingly connecting said drive shaft and said countershaft, a plurality of gears carried by said countershaft, gear means rotatably mounted on said driven shaft and drivingly connected with said plurality of gears, a combined gear and clutching torque transmitting member drivingly connected with said driven shaft, and a plurality of slidable pins carried by said combined gear and clutching torque transmitting member and selectively slidable into apertures defined by said gear means to positively connect said gear means and said combined gear and clutching torque transmitting member and thereby complete a power train between said drive and driven shafts which extends through said gear means and through said plurality of gears.

12. In a transmission, the combination of a drive shaft, a driven shaft, a plurality of selectively operable elements comprising torque multiplying gearing for providing a plurality of different driving ratios between said shafts, said gearing including a pair of selectively slidable gears continuously in mesh with each other, a first pair of said elements being associated with one of said gears, a second pair of said elements being associated with the other of said gears, external clutch teeth formed on each element of said pair of elements, and internal clutch teeth formed on each of said gears for selectively clutching either of the gears to either of their associated pair of elements for completing said plurality of different driving ratios between said shafts.

13. In a transmission, the combination of a drive shaft, a driven shaft disposed in axial alignment with said drive shaft, a plurality of selectively operable elements comprising torque multiplying gearing for providing a plurality of different driving ratios between said shafts, said gearing including a pair of continuously meshing gears, a first pair of said elements being associated with one of said gears, a second pair of said elements being associated with the other of said gears, each element of both pairs thereof defining pin receiving apertures providing positive clutching means, and a plurality of pins carried by each of said gears and selectively slidable into the apertures in the associated elements for selectively clutching the gears to their associated elements to complete the different power trains.

14. In a transmission, the combination of a drive shaft, a driven shaft disposed in axial alignment with said drive shaft, a plurality of selectively operable elements comprising torque multiplying gearing for providing a plurality of different driving ratios between said shafts, said gearing including a pair of continuously meshing gears, a first pair of said elements being associated with one of said gears, a second pair of said elements being associated with the other of said gears, each element of both pairs thereof defining pin receiving apertures providing positive clutching means, a plurality of pins carried by each of said gears and selectively slidable into the apertures in the associated elements for selectively clutching the gears to their associated elements to complete the different power trains, and friction clutch means between each of the gears and its associated pair of elements for synchronizing the speeds of rotation of the gear and element to be clutched together and preventing positive clutching therebetween until the synchronization is effected.

15. In a transmission, the combination of a drive shaft, a driven shaft disposed in axial alignment with said drive shaft, a countershaft; a sleeve shaft and a gear hub respectively rotatable and concentrically mounted around said driven shaft and said countershaft; torque multiplying and transmitting means drivingly connecting said drive shaft, countershaft, sleeve shaft and gear hub; and selectively operable means for selectively drivingly connecting said driven shaft with said sleeve shaft or gear hub to thereby selectively complete a pair of power trains between said drive and driven shafts.

16. In a transmission, the combination of a drive shaft, a driven shaft disposed in axial alignment with said drive shaft, a countershaft; a sleeve shaft and a gear hub respectively rotatably and concentrically mounted around said driven shaft and said countershaft; torque multiplying and transmitting means drivingly connecting said drive shaft, countershaft, sleeve shaft and gear hub; and selectively operable means for selectively drivingly connecting said driven shaft with said sleeve shaft or said gear hub to thereby selectively complete a pair of power trains between said drive and driven shafts, and selectively operable means for selectively and drivingly connecting said driven shaft with either said drive shaft or said countershaft to thereby selectively complete a different pair of power trains between said drive and driven shafts.

17. In a synchronizing transmission, the combination of a pair of relatively rotatable axially aligned torque transmitting members selectively connectible for completing a drive through the transmission, each of said torque transmitting members including means defining a plurality of axially extending openings disposed concentrically around the axes of said members, one of said members including means defining a friction face integrally formed thereon, a synchronizer ring connected to the other member by means of a lost motion connection permitting limited peripheral and axial movement of the synchronizer ring with respect to said other member, said synchronizer ring including means defining a friction face adapted to frictionally engage the friction face on said one member for effecting frictional clutching engagement between said members, a plurality of thrust pins disposed in certain of the openings in said other member and effective upon axial movement to exert an axial thrust on said synchronizer ring for effecting engagement of said friction surfaces, a plurality of clutch pins disposed in the remainder of the openings in said other member and slidable axially into the openings in said one member for effecting positive clutching engagement between said members, and means connected positively to said clutch pins and releasably to said thrust pins for initially moving said thrust pins so as to effect frictional engagement between said friction faces and consequent synchronization of said members and thereafter moving said clutch pins into the openings in said one member to effect positive clutch engagement between said members.

18. In a synchronizing transmission, the combination of a pair of relatively rotatable axially aligned torque transmitting members selectively connectible for completing a drive through the transmission, each of said torque transmitting members including means defining a plurality of axially extending openings disposed concentrically around the axes of said members, one of said members including means defining a friction face integrally formed thereon, a synchronizer ring connected to the other member by means of a lost motion connection permitting limited peripheral and axial movement of the synchronizer ring with respect to said other member, said synchronizer ring including means defining a friction face adapted to frictionally engage the friction face on said one member for effecting frictional clutching engagement between said members, a plurality of thrust pins disposed in certain of the openings in said other member and effective upon axial movement to exert an axial thrust on said synchronizer ring for effecting engagement of said friction surfaces, a plurality of clutch pins disposed in the remainder of the openings in said other member and slidable axially into the openings in said one member for effecting positive clutching engagement between said members, said synchronizer ring including means normally adapted to block the path of axial advance of said clutch pins and adapted when in one of the positions permitted by said lost motion connection to permit axial advance of said clutch pins into the openings in said one member, and means connected positively to said clutch pins and releasably to said thrust pins for initially moving said thrust pins so as to effect frictional engagement between said friction faces and consequent synchronization of said members and thereafter moving said clutch pins into the openings in said one member to effect positive clutch engagement between said members, after said synchronizer ring has moved to said one position permitted by said lost motion connection.

19. In a synchronizing transmission, the combination of a pair of relatively rotatable axially aligned torque transmitting members selectively connectible for completing a drive through the transmission, each of said torque transmitting members including means defining a plurality of axially extending openings disposed concentrically around the axes of said members, one of said members including means defining a friction face integrally formed thereon, a synchronizer ring connected to the other member by means of a lost motion connection permitting limited peripheral and axial movement of the synchronizer ring with respect to said other member, said synchronizer ring including means defining a friction face adapted to frictionally engage the friction face on said one member for effecting frictional clutching engagement between said members, a plurality of thrust pins disposed in certain of the openings in said other member and effective upon axial movement to exert an axial thrust on said synchronizer ring for effecting engagement of said friction surfaces, a plurality of clutch pins disposed in the remainder of the openings in said other member and slidable axially into the openings in said one member for effecting positive clutching engagement between said members, and a control collar concentrically mounted around said other member having a positive connection with said clutch pins and a breakaway connection with said thrust pins, whereby upon initial axial movement of said collar toward said one member an axial thrust is transmitted by said thrust pins to said synchronizer ring for effecting a frictional connection between said members and thereafter when synchronization is effected between said members the further axial movement of said collar effects a release of said thrust pins and movement of said clutch pins into the openings of said one member to effect positive clutch engagement between said members.

20. In a synchronizing transmission, the combination of three relatively rotatable axially aligned torque transmitting members, a first one of said members being selectively connectible with either of the other members for selectively completing a pair of drives through the transmission, each of said torque transmitting members including means defining a plurality of axially extending openings disposed concentrically around the axes of said members, each of said other members including means defining a friction face integrally formed thereon, a pair of synchronizer rings each connected to said one member by means of a lost motion connection permitting limited peripheral and axial movement of the synchronizer rings with respect to said one member, each of said synchronizer rings including means defining a friction face thereon respectively adapted to frictionally engage the friction faces on said other members for effecting frictional clutch engagement between said one member and either of the other members, a plurality of thrust pins disposed in certain of the openings in said one member and effective upon axial movement to exert an axial thrust on one of said synchronizer rings for effecting engagement of said friction surfaces, a plurality of clutch pins disposed in the remainder of the openings in said one member and slidable axially into the openings in either of said other members for effecting positive clutching engagement between the one member and either of said other members, and means connected positively to said clutch pins and releasably to said thrust pins for initially moving said thrust pins so as to effect frictional engagement between the friction faces on one of said synchronizer rings and one of said other members and consequent synchronization of said one member with the other member and thereafter moving said clutch pins into the openings in the other member to effect positive clutch engagement between the one member and the selected other member.

References Cited in the file of this patent

UNITED STATES PATENTS

| | | |
|---|---|---|
| 2,021,404 | Church | Nov. 19, 1935 |
| 2,240,995 | Maier | May 6, 1941 |
| 2,266,397 | Norelius | Dec. 16, 1941 |
| 2,362,925 | Peterson | Nov. 14, 1944 |
| 2,403,378 | Kilpela | July 2, 1946 |
| 2,512,036 | Orr | June 20, 1950 |
| 2,563,726 | Kelbel | Aug. 7, 1951 |